(12) United States Patent
Zhang

(10) Patent No.: US 7,757,999 B2
(45) Date of Patent: Jul. 20, 2010

(54) FOLDAWAY WORKTABLE

(75) Inventor: Chongyi Zhang, Suzhou (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 401 days.

(21) Appl. No.: 11/591,883

(22) Filed: Nov. 2, 2006

(65) Prior Publication Data

US 2007/0045506 A1  Mar. 1, 2007

Related U.S. Application Data

(63) Continuation-in-part of application No. 10/886,382, filed on Jul. 7, 2004, now Pat. No. 7,243,896.

(30) Foreign Application Priority Data

Jul. 17, 2003 (CN) ............................. 03 2 59720 U

(51) Int. Cl.
*F16M 11/38* (2006.01)

(52) U.S. Cl. ...................... 248/166; 248/165; 248/169; 108/118

(58) Field of Classification Search ................ 248/166, 248/165, 169, 170, 171, 439, 172, 173, 440.1, 248/164, 150; 108/118, 115, 119, 129, 116, 108/99

See application file for complete search history.

(56) References Cited

U.S. PATENT DOCUMENTS

| | | | | |
|---|---|---|---|---|
| 28,921 A * | 6/1860 | Tracy | ...................... | 108/120 |
| 33,286 A * | 9/1861 | Ashald | ........................ | 108/62 |
| 73,416 A * | 1/1868 | White | ...................... | 297/174 R |
| 231,252 A * | 8/1880 | Atkinson | ................... | 108/119 |
| 271,895 A * | 2/1883 | Miller | ........................ | 108/116 |
| 287,739 A | 10/1883 | Tull | | |
| 313,280 A * | 3/1885 | Bell | ........................... | 108/29 |
| 600,148 A * | 3/1898 | Hanger | ......................... | 108/10 |
| 611,223 A * | 9/1898 | Ritchie | ...................... | 108/117 |
| 635,486 A * | 10/1899 | Ihde | ........................... | 108/119 |
| 800,233 A | 9/1905 | McConnell | | |
| 867,816 A * | 10/1907 | Garret | ........................ | 108/101 |
| 1,073,122 A * | 9/1913 | Henne | ......................... | 108/99 |
| 1,876,400 A | 9/1932 | Cederquist | | |
| 1,941,333 A * | 12/1933 | Whalley et al. | .............. | 108/119 |
| 2,003,581 A * | 6/1935 | Daly, Jr. | ..................... | 182/141 |
| 2,624,469 A * | 1/1953 | Adamson et al. | ............ | 108/116 |
| 2,829,863 A | 4/1958 | Gibson | | |
| 2,845,317 A | 7/1958 | Orman | | |
| 2,849,745 A | 9/1958 | Madsen | | |

(Continued)

*Primary Examiner*—Kimberly T Wood
(74) *Attorney, Agent, or Firm*—McDermott Will & Emery LLP

(57) ABSTRACT

The present invention discloses a foldaway worktable mainly for supporting cutting tools. The foldaway worktable comprises a supporting portion and a bracket portion, wherein the supporting portion is disposed on the bracket portion and the bracket portion comprises at least two retractable bars. A connecting bar is connected to and located between the retractable bars. The bracket portion further comprises a clamping device which is rotatably mounted on the connecting bar. When the worktable is fully folded, the length of the retractable bars remains fixed by using the clamping device. The clamping device also allows for avoidance of the inconveniences that normally arise during transport of the worktable, including the unfolding and outspreading of the retractable bars. Therefore, the foldaway worktable is convenient to use whether it is being moved, stored, packed or transported.

16 Claims, 4 Drawing Sheets

U.S. PATENT DOCUMENTS

| | | | |
|---|---|---|---|
| 3,897,924 A * | 8/1975 | Cook | 248/164 |
| 3,988,021 A | 10/1976 | Grover | |
| 4,133,412 A | 1/1979 | Hildebrandt | |
| 4,148,264 A | 4/1979 | Caravias | |
| 4,239,259 A | 12/1980 | Martinez | |
| 4,714,224 A * | 12/1987 | Calmes | 248/465 |
| 4,815,391 A | 3/1989 | Lee | |
| 5,004,029 A | 4/1991 | Garner | |
| 5,011,104 A | 4/1991 | Fang | |
| 5,833,201 A | 11/1998 | Graybill | |
| 6,314,893 B1 * | 11/2001 | Lee | 108/119 |
| 6,722,618 B1 | 4/2004 | Wu | |
| 7,055,847 B2 | 6/2006 | Miller et al. | |
| 2004/0025759 A1 * | 2/2004 | Lee | 108/118 |
| 2005/0133682 A1 | 6/2005 | Huang | |

* cited by examiner

FOLDAWAY WORKTABLE

CROSS-REFERENCE TO RELATED APPLICATIONS

The present application is a continuation-in-part application of U.S. patent application Ser. No. 10/886,382 filed Jul. 7, 2004 now U.S. Pat. No. 7,243,896, which claims priority from Chinese Application No. 03 2 59720.7 filed Jul. 17, 2003, which are here incorporated by reference.

FIELD OF THE INVENTION

The present invention relates to a foldaway worktable, and specifically, it relates to a foldaway worktable for supporting cutting tools.

BACKGROUND OF THE INVENTION

A foldaway worktable as known typically comprises a supporting portion and a bracket portion. The supporting portion is disposed on the bracket portion and used for supporting cutting tools thereon. The bracket portion includes telescoping legs, on the top of which bars are connected therebetween. Another bar is installed between and approximately in the middle of the telescoping legs. Wheels are mounted to the lower part of the bracket portion. When the telescoping legs are near fully retracted, the worktable can be folded into a compact size, making it much more convenient for being moved, stored, packed or transported. A common drawback to foldable worktables is that in order to move a folded worktable, users usually hold onto connecting bars, which are fixed to the top of the telescoping legs. The user then pulls the worktable with its wheels rolling on the floor. This movement generally causes the telescoping legs to be stretched and separated apart from each other, and consequently it is difficult for users to move such a worktable. To avoid this inconvenience, users usually bind the top connecting bars and the middle bar together with a cord to fix the telescoping legs. However, this is also a somewhat difficult and inconvenient solution.

SUMMARY OF THE INVENTION

It is an object of the present invention to overcome shortages of the prior art and to provide an improved foldaway worktable wherein the telescoping legs can not be stretched during displacement after the worktable is folded.

The foldaway worktable of the present invention comprises a bracket portion with a supporting portion mounted thereon, wherein the bracket portion includes at least two telescoping legs. A connecting bar is located between the legs. The bracket portion also includes a clamp device, and is disposed on said connecting bar and is rotatable around said connecting bar. With such a structure, the length of the telescoping legs is fixed in a simple and expedient way.

BRIEF DESCRIPTION OF THE DRAWINGS

Advantages and novel features of the present invention will become apparent from the following detailed description of the preferred embodiment of the invention illustrated in the accompanying drawings, wherein.

DESCRIPTION OF THE PREFERRED EMBODIMENTS

Figure 1:
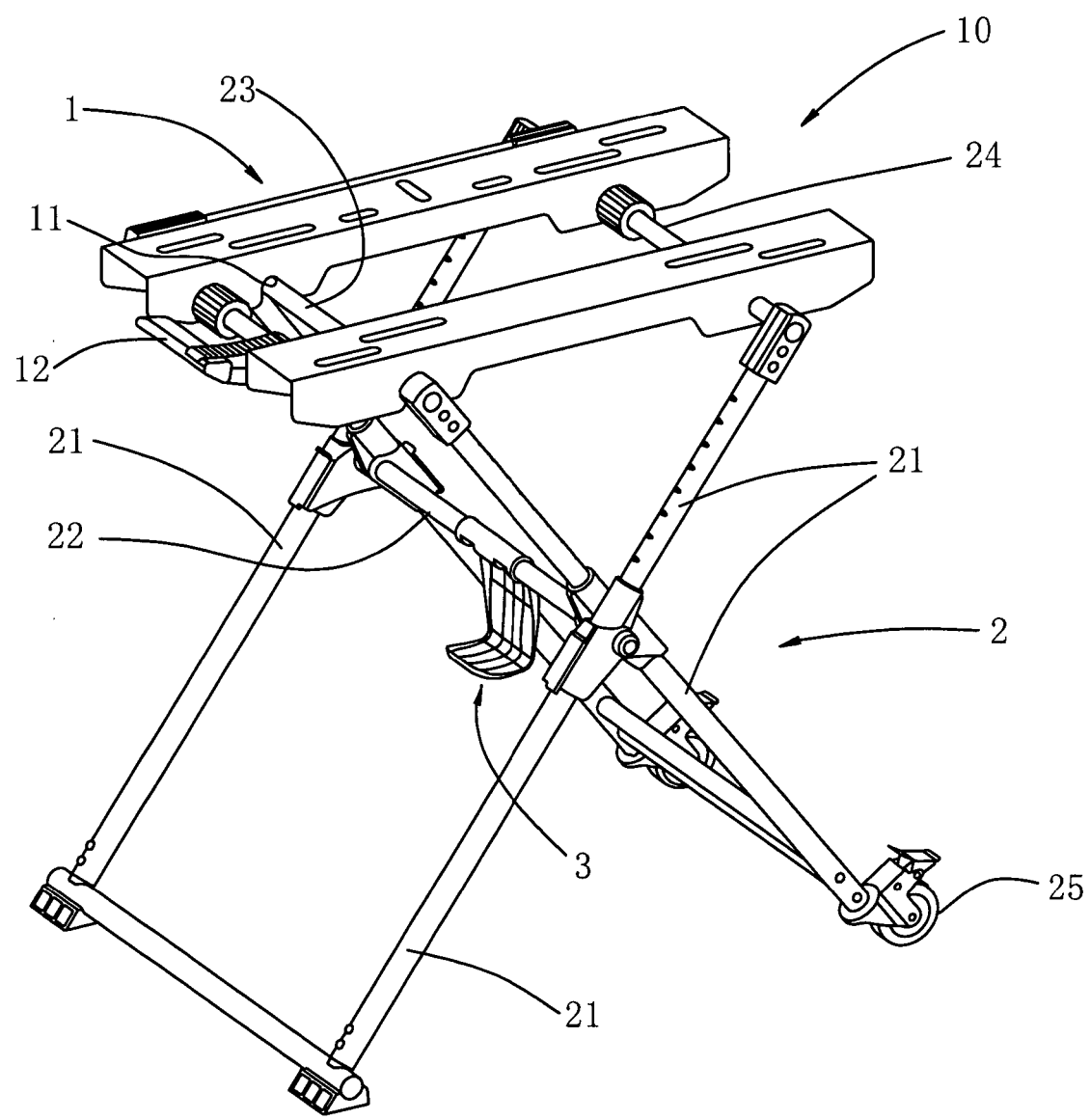
FIG. 1 is a perspective view of the preferred embodiment of a foldaway worktable according to the present invention.

Referring to FIG. 1, a foldaway worktable 10 comprises a supporting portion 1 and a bracket portion 2, wherein the supporting portion 1 is disposed on the bracket portion 2 for supporting cutting tools thereon. The bracket portion 2 includes two pairs of telescoping legs 21. A connecting bar 22 is connected between the central portions of the two pairs of telescoping legs 21, such that the telescoping legs 21 are pivotable around the connecting bar 22. The top of the two pairs of telescoping legs 21 are respectively connected by two supporting bars 23, 24, which are parallel to the connecting bar 22. Wheels 25 are fixed to the lower portion of the bracket portion 2.

One end of the supporting portion 1 is supported on the supporting bar 23 with a pair of grooves 11 of the supporting portion 1 being seated on the supporting bar 23. The grooves are sized to accommodate the supporting bar 23, such that when the supporting bar 23 is located in the grooves, the supporting portion 1 is relatively stable. The other end of the supporting portion 1 is pivotally mounted to another supporting bar 24. A handle 12 is fixedly mounted to the supporting portion 1. The bracket portion 2 further includes a clamping device 3 which is pivotally installed on the connecting bar 22 and is limited against axial movement.

Figure 2:
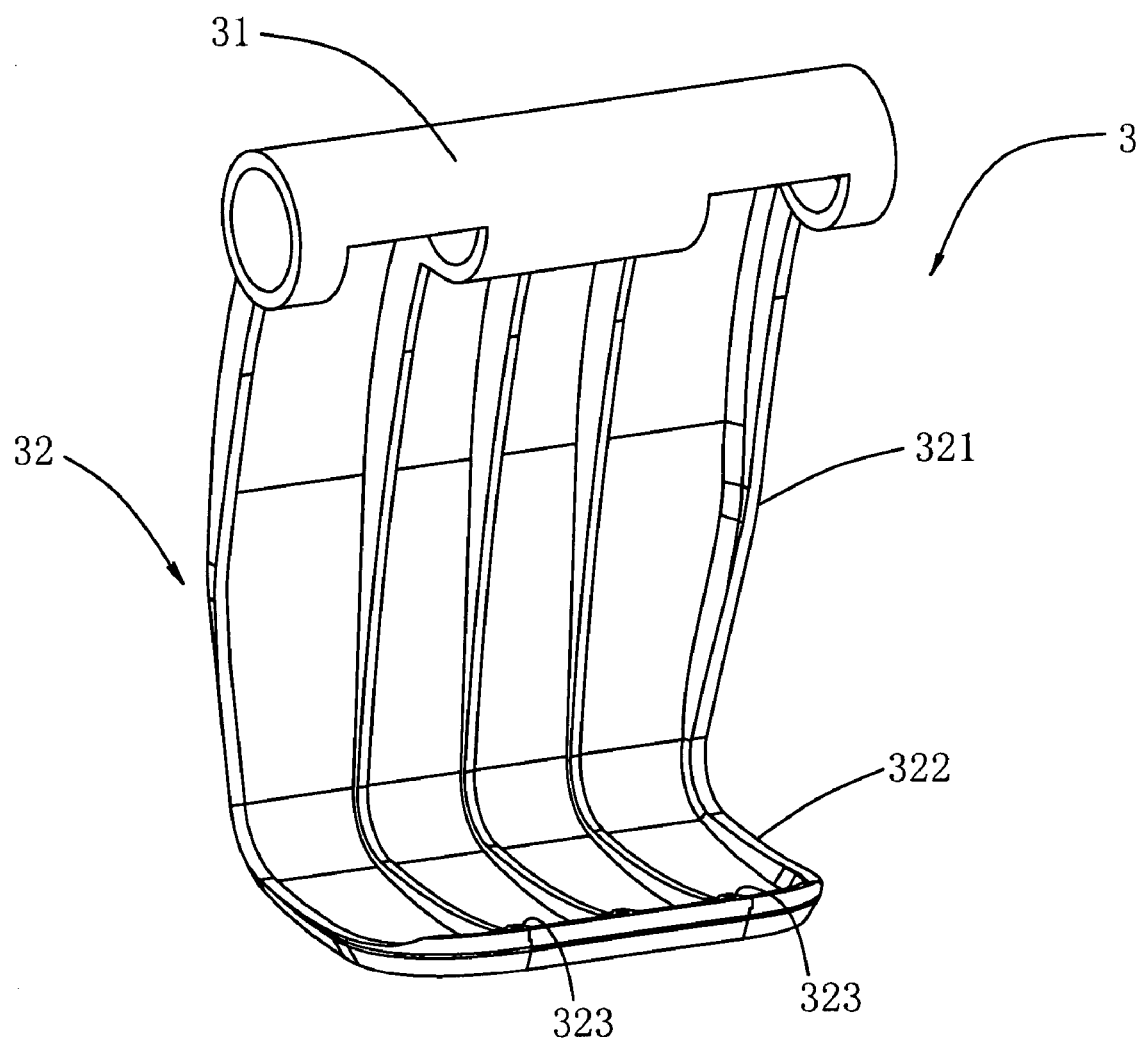
FIG. 2 is an enlarged view of the clamping device of the foldaway worktable of FIG. 1.

As shown in FIGS. 1 and 2, the clamping device 3 includes a mounting portion 31 and a clamping portion 32. The mounting portion 31 is mounted to the connecting bar 22. The mounting portion 31 can be permanently mounted to the connecting bar 22, or it can be removably mounted, such that the clamping device 3 can be easily removed and remounted on the connecting bar 22. The clamping portion 32 is approximately L-shaped, and comprises a main body 321 and a curved segment 322. At the end of the curved segment 322, a protrusion 323 is provided. The protrusion 323 serves as locking means in order to secure the foldaway worktable when it is in its folded and more compact state.

To fold the worktable 10, a user can firstly hold the handle 12 of the supporting portion 1 and raise it up so as to disengage the groove 11 from the supporting bar 23. The user can then rotate the supporting portion 1 around the supporting bar 24. After that, the user can push on the top of the telescoping legs 21 to urge the telescoping legs 21 to slide down in its axis direction and retract to their shortest length as shown in FIG. 3.

Figure 3:
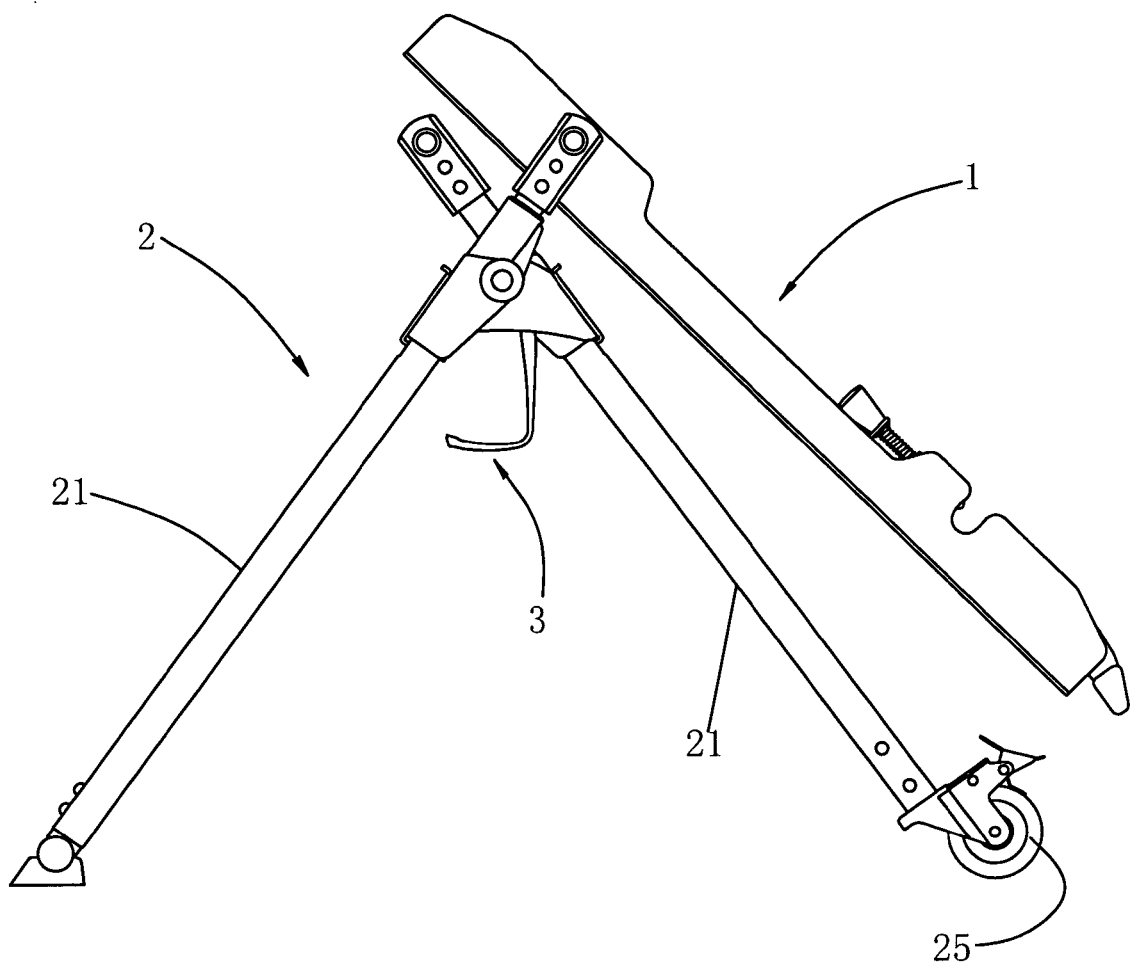
FIG. 3 shows the foldaway worktable of FIG. 1 which is in the half-folded state.

Next, the user can rotate the telescoping legs 21 around the connecting bar 22 from the half-folded state as shown in FIG. 3, bringing the two pairs of the telescoping legs 21 close to each other in an approximately parallel position. The bracket portion 2 forms a rectangle frame with a shortest distance between the connecting bar 22 and the supporting bars 23, 24. Then, the user can counterturn the supporting portion 1 around the supporting bars 24 to a position where the supporting portion 1 abuts the telescoping legs 21 and is substantially parallel to them.

Figure 4:
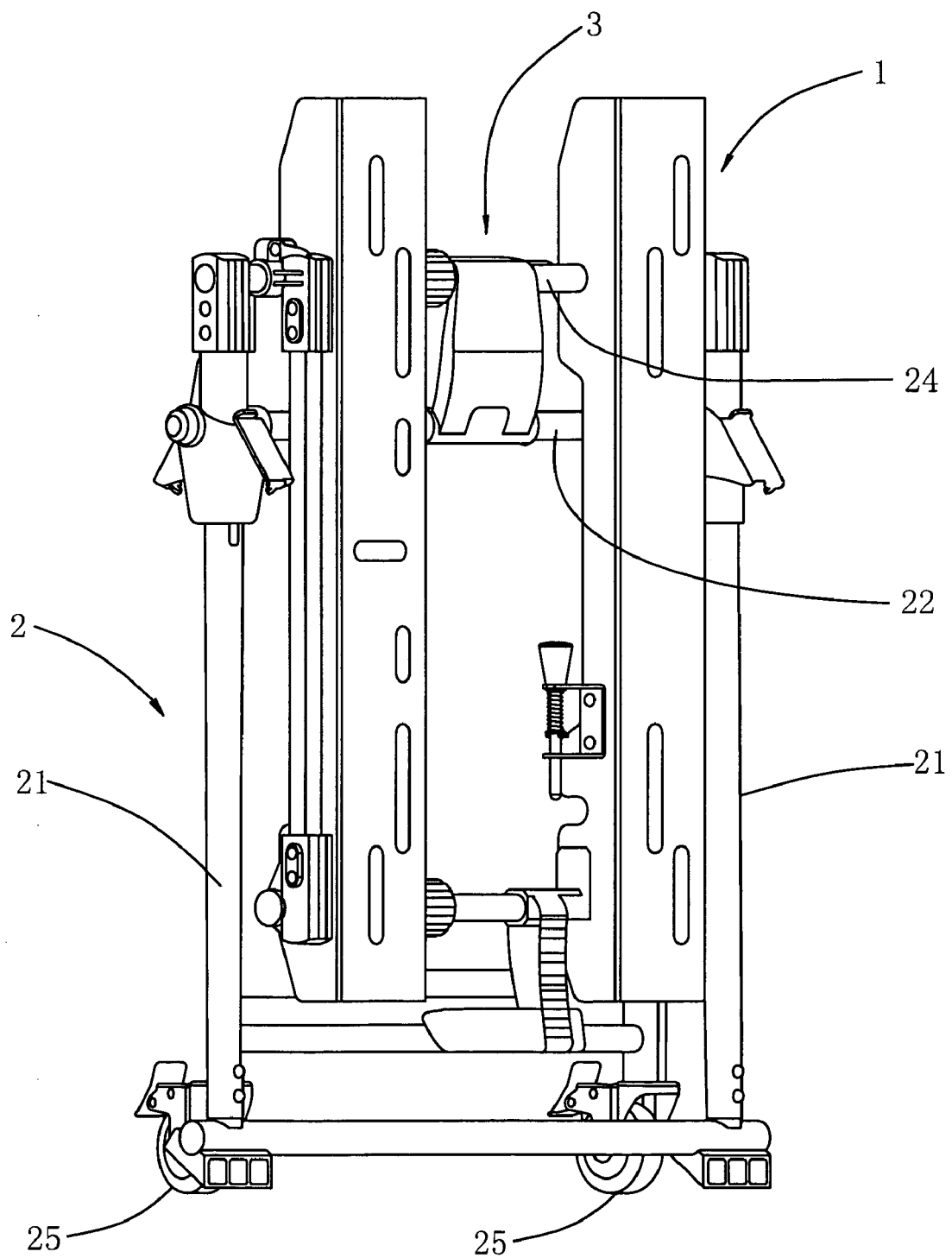
FIG. 4 shows the foldaway worktable of FIG. 1 which is in the complete-folded state.

Finally, the user can rotate the clamping device 3 around the connecting bar 22 to a position where the curved segment 322 of the clamping portion 32 is approximately parallel to the supporting bars 23, 24. The user then gently presses the clamping portion 32 towards the supporting bars 23, 24 to hold the supporting bars 23 therein. The clamping portion 32 should be gently pressed until the supporting bars 23, 24 are received in the curved segment 322. As a result, both of the two supporting bars 23, 24 are secured in the curved segment 322, the clamping device 3 acting as a fastener, as shown in FIG. 4.

To move the folded worktable 10, the user need simply hold the mounting portion 31 of the clamping device 3, tilt the worktable 10, and move it on the wheels 25. Stopped by the protrusion 323, the supporting bars 23, 24 will not automatically disengage from the clamping portion 32 during the movement. The protrusion 323 serves as a securing device to ensure the supporting bars 23, 24 will stay in the curved portion 322 by creating a slight barrier. Thus, inconveniences caused by unfolding and outspreading of the telescoping legs 21 during movement of the worktable 10 are avoided. While the protrusion 323 is strong enough to keep the supporting bars 23, 24 in place during transport or storage, a small amount of manual force will be enough to overcome the protrusion 323 and disengage the supporting bars 23, 24. Therefore, it is only after manually pulling out the curved segment 322, that the clamping device 3 will disengage with the supporting bars 23, 24, such that security and convenience during the movement are ensured.

The foldaway worktable of the present invention is not restricted as described and illustrated hereinabove. The bracket portion of the foldaway worktable, for example, may merely comprise two telescoping legs, wherebetween a connecting bar is connected with a clamping device installed thereon. And other shapes or numbers of the clamping device may also be available. Other embodiments in variations to the preferred embodiments will be apparent to those skilled in the art and may be made without departing from the spirit and scope of the invention as defined in the appended claims.

What is claimed is:

1. A foldaway worktable, comprising:
   a supporting portion;
   a bracket portion;
   wherein the supporting portion is disposed on the bracket portion, and the bracket portion comprises at least two retractable bars;
   a bar connected between said retractable bars;
wherein the bracket portion further comprises a clamping device rotatably mounted on the connecting bar;
   the foldaway worktable further comprising two states, in the first state the retractable bars being outspread, the supporting portion being horizontal, and the clamping device freely hanging on the connecting bar; in the second state, the retractable bars being folded and retracted to its shortest length, a curved segment of the clamping device clasping the supporting bar.

2. The foldaway worktable of claim 1, the clamping device comprises
   a clamping portion,
   and a mounting portion via which the clamping device is installed on the connecting bar.

3. The foldaway worktable of claim 2, the clamping portion is approximately L-shaped, and comprises a main body and a curved segment having a protrusion.

4. The foldaway worktable of claim 1, at least one supporting bar is disposed at a top end of the retractable bars.

5. The foldaway worktable of claim 1, the supporting portion being installed on the top of the retractable bars in such a manner that said supporting portion being able to overturn around the retractable bars.

6. The foldaway worktable of claim 1, said supporting portion comprises a handle.

7. The foldaway worktable of claim 1, wheels are fixed to a lower portion of the bracket portion.

8. A foldaway worktable, comprising:
   a supporting portion;
   a bracket portion;
wherein the supporting portion is disposed on the bracket portion, and the bracket portion comprises at least two sets of retractable bars;
   a support bar connected to one end of each set of the retractable bars;
   a connecting bar located between and connected to the two sets of retractable bars;
wherein the bracket portion further comprises a clamping device including a clamping portion and a mounting portion, the clamping device being removably mounted on the connecting bar for selectively fixing to at least one of the support bars;
   wherein the worktable further comprises two states, in the first state the retractable bars being outspread, the supporting portion being approximately horizontal, and the clamping device freely hanging on the connecting bar; in the second state, the retractable bars being folded and retracted to the shortest length, the curved segment of the clamping device clasping the supporting bar.

9. The foldaway worktable of claim 8, wherein the mounting portion is pivotally mounted on the connecting bar.

10. The foldaway worktable of claim 9, wherein the clamping portion is generally L-shaped, and comprises a main body and a curved outer segment having a protrusion.

11. The foldaway worktable of claim 8 comprising at least one supporting bar disposed at a top end of one of the two sets of the retractable bars.

12. The foldaway worktable of claim 8, wherein the supporting portion is installed on the top of the retractable bars in such a manner that said supporting portion is rotatable.

13. The foldaway worktable of claim 8, wherein the supporting portion comprises a handle.

14. The foldaway worktable of claim 8, wherein wheels are fixed to a lower portion of the bracket portion.

15. A worktable being foldable from an open position to a closed position, the worktable comprising:
   a first pair of telescoping legs;
   a second pair of telescoping legs;
   a bar connecting central portions of the first and second pair of telescoping legs;
   a first support bar connected to one end of the first pair of telescoping legs;
   a second support bar connected to one end of the second pair of telescoping legs;
   a supporting member pivotally connected to one of either the first or second support bar; and
   a clamping member having an L-shaped clamping portion and a mounting portion pivotally mounted on the bar connecting central portions of the first and second pair of telescoping legs;
   wherein in the open position, the telescoping legs are elongated and the supporting member is approximately horizontal and the clamping member hangs downwardly from the connecting bar; and in the closed position the telescoping legs are retracted and the clamping member clasps the one of either the first and second support bars.

16. The worktable of claim 15, wherein in the closed position, the supporting member is substantially parallel to the first and second pairs of telescoping legs.

* * * * *